(12) United States Patent
Hermalyn et al.

(10) Patent No.: US 10,558,873 B2
(45) Date of Patent: Feb. 11, 2020

(54) METHODS AND SYSTEMS FOR CONTROLLING EXTENT OF LIGHT ENCOUNTERED BY AN IMAGE CAPTURE DEVICE OF A SELF-DRIVING VEHICLE

(71) Applicant: Waymo LLC, Mountain View, CA (US)

(72) Inventors: Brendan Hermalyn, San Francisco, CA (US); Andreas Wendel, Mountain View, CA (US); Jeremy Dittmer, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 18 days.

(21) Appl. No.: 15/842,182

(22) Filed: Dec. 14, 2017

(65) Prior Publication Data
US 2019/0188502 A1 Jun. 20, 2019

(51) Int. Cl.
*G06K 9/80* (2006.01)
*B60S 1/04* (2006.01)
(Continued)

(52) U.S. Cl.
CPC ............ *G06K 9/00825* (2013.01); *B60R 1/00* (2013.01); *B60R 11/04* (2013.01);
(Continued)

(58) Field of Classification Search
CPC .... H04N 5/2254; H04N 7/183; H04N 5/2351; B60J 3/04; B60J 3/06; B60W 2420/42;
(Continued)

(56) References Cited

U.S. PATENT DOCUMENTS 6,667,471 B2 12/2003 Donnelly
6,811,201 B2 11/2004 Naik
(Continued)

FOREIGN PATENT DOCUMENTS

EP 2351351 B1 9/2015
EP 2948928 B1 7/2017
(Continued)

OTHER PUBLICATIONS

International Search Report and Written Opinion for corresponding PCT application No. PCT/US2018/063639, dated Apr. 1, 2019.

*Primary Examiner* — Alison Slater
(74) *Attorney, Agent, or Firm* — McDonnell Boehnen Hulbert & Berghoff LLP

(57) ABSTRACT

Example implementations may relate to use of a light-control feature to control extent of light encountered by an image capture device of a self-driving vehicle. In particular, a computing system of the vehicle may make a determination that quality of image data generated by an image capture device is or is expected to be lower than a threshold quality due to external light encountered or expected to be encountered by the image capture device. In response to the determination, the computing system may make an adjustment to the light-control feature to control the extent of external light encountered or expected to be encountered by the image capture device. This adjustment may ultimately help improve quality of image data generated by the image capture device. As such, the computing system may operate the vehicle based at least on image data generated by the image capture device.

19 Claims, 15 Drawing Sheets

(51) Int. Cl.
*B60S 1/32* (2006.01)
*B60S 1/38* (2006.01)
*B60R 1/00* (2006.01)
*G06K 9/00* (2006.01)
*H04N 7/18* (2006.01)
*B60R 11/04* (2006.01)

(52) U.S. Cl.
CPC ........... *G06K 9/00818* (2013.01); *H04N 7/18* (2013.01); *B60R 2300/102* (2013.01); *B60R 2300/307* (2013.01)

(58) Field of Classification Search
CPC .......... B60W 2550/22; B60W 50/0097; G02B 2027/0118
See application file for complete search history.

(56) References Cited

U.S. PATENT DOCUMENTS

| | | | |
|---|---|---|---|
| 8,392,074 B2 | 3/2013 | Zeng | |
| 9,720,415 B2 | 8/2017 | Levinson | |
| 2003/0103141 A1 | 6/2003 | Bechtel | |
| 2006/0140502 A1 | 6/2006 | Tseng | |
| 2011/0227952 A1 | 9/2011 | Hamaguchi | |
| 2013/0027511 A1 | 1/2013 | Takemura | |
| 2014/0009615 A1 | 1/2014 | Kiyohara et al. | |
| 2014/0029008 A1* | 1/2014 | Hirai | G01N 21/552 356/445 |
| 2014/0214255 A1 | 7/2014 | Dolgov | |
| 2015/0124150 A1 | 5/2015 | Hibino | |
| 2017/0001565 A1 | 1/2017 | Nakano et al. | |
| 2017/0177000 A1 | 6/2017 | Meyhofer et al. | |
| 2017/0195605 A1 | 7/2017 | Alves | |
| 2017/0219374 A1 | 8/2017 | Sitarski | |
| 2017/0302838 A1* | 10/2017 | Yang | H04N 5/23229 |
| 2018/0017791 A1* | 1/2018 | Beckman | G02B 27/01 |
| 2018/0091717 A1* | 3/2018 | Ion | H04N 5/2351 |
| 2018/0134217 A1* | 5/2018 | Peterson | B60R 1/06 |
| 2018/0304727 A1* | 10/2018 | Choi | B60J 3/04 |
| 2019/0035276 A1* | 1/2019 | Zruya | G08G 1/0965 |
| 2019/0186931 A1* | 6/2019 | Dittmer | G06T 7/70 |

FOREIGN PATENT DOCUMENTS

| | | |
|---|---|---|
| JP | 2017207340 A | 11/2017 |
| WO | 2016197307 A1 | 12/2016 |

* cited by examiner

METHODS AND SYSTEMS FOR CONTROLLING EXTENT OF LIGHT ENCOUNTERED BY AN IMAGE CAPTURE DEVICE OF A SELF-DRIVING VEHICLE

BACKGROUND

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by an autonomous vehicle system (i.e., any one or more computer systems that individually or collectively function to facilitate control of the autonomous vehicle). In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In one aspect, a method is disclosed. The method involves making a determination, by a computing system, that quality of image data generated by an image capture device is or is expected to be lower than a threshold quality due to external light encountered or expected to be encountered by the image capture device, where the image capture device is coupled to a vehicle, and where the vehicle includes a light-control feature that is adjustable to control an extent of external light encountered by the image capture device. The method also involves, in response to the determination, making an adjustment, by the computing system, to the light-control feature to control the extent of external light encountered or expected to be encountered by the image capture device. The method further involves operating the vehicle based at least on image data generated by the image capture device.

In another aspect, another method is disclosed. The method involves making a determination, by a computing system, that a light source is proximate to an object within a field of view of an image capture device from a perspective of the image capture device, where the image capture device is coupled to a vehicle, and where the vehicle includes a light-control feature that is adjustable to control an extent of external light encountered by the image capture device. The method also involves, in response to the determination, making an adjustment, by the computing system, to the light-control feature to block at least a portion of the light source in the field of view of the image capture device.

In yet another aspect, a vehicle is disclosed. The vehicle includes an image capture device configured to generate image data representative of an environment around the vehicle, a mechanical device that is movable relative to a field of view of the image capture device, and a computing system. The computing system may be configured to make a determination that a light source is proximate to an object within the field of view of an image capture device from a perspective of the image capture device. The computing system may also be configured to, in response to the determination, cause a movement of the mechanical device to block at least a portion of light from the light source in the field of view of the image capture device. The computing system may further be configured to operate the vehicle based on image data generated by the image capture device.

In yet another aspect, a system is disclosed. The system may include means for making a determination that quality of image data generated by an image capture device is or is expected to be lower than a threshold quality due to external light encountered or expected to be encountered by the image capture device, where the image capture device is coupled to a vehicle, and where the vehicle includes a light-control feature that is adjustable to control an extent of external light encountered by the image capture device. The system may also include means for, in response to the determination, making an adjustment to the light-control feature to control the extent of external light encountered or expected to be encountered by the image capture device. The system may further include means for operating the vehicle based at least on image data generated by the image capture device.

In yet another aspect, another system is disclosed. The system may include means for making a determination that a light source is proximate to an object within a field of view of an image capture device from a perspective of the image capture device, where the image capture device is coupled to a vehicle, and where the vehicle includes a light-control feature that is adjustable to control an extent of external light encountered by the image capture device. The system may also include means for, in response to the determination, making an adjustment to the light-control feature to block at least a portion of the light source in the field of view of the image capture device.

In yet another aspect, yet another system is disclosed. The system may include means for making a determination that a light source is proximate to an object within a field of view of an image capture device from a perspective of the image capture device. The system may also include means for, in response to the determination, causing a movement of a mechanical device to block at least a portion of light from the light source in the field of view of the image capture device. The system may further include means for operating a vehicle based on image data generated by the image capture device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
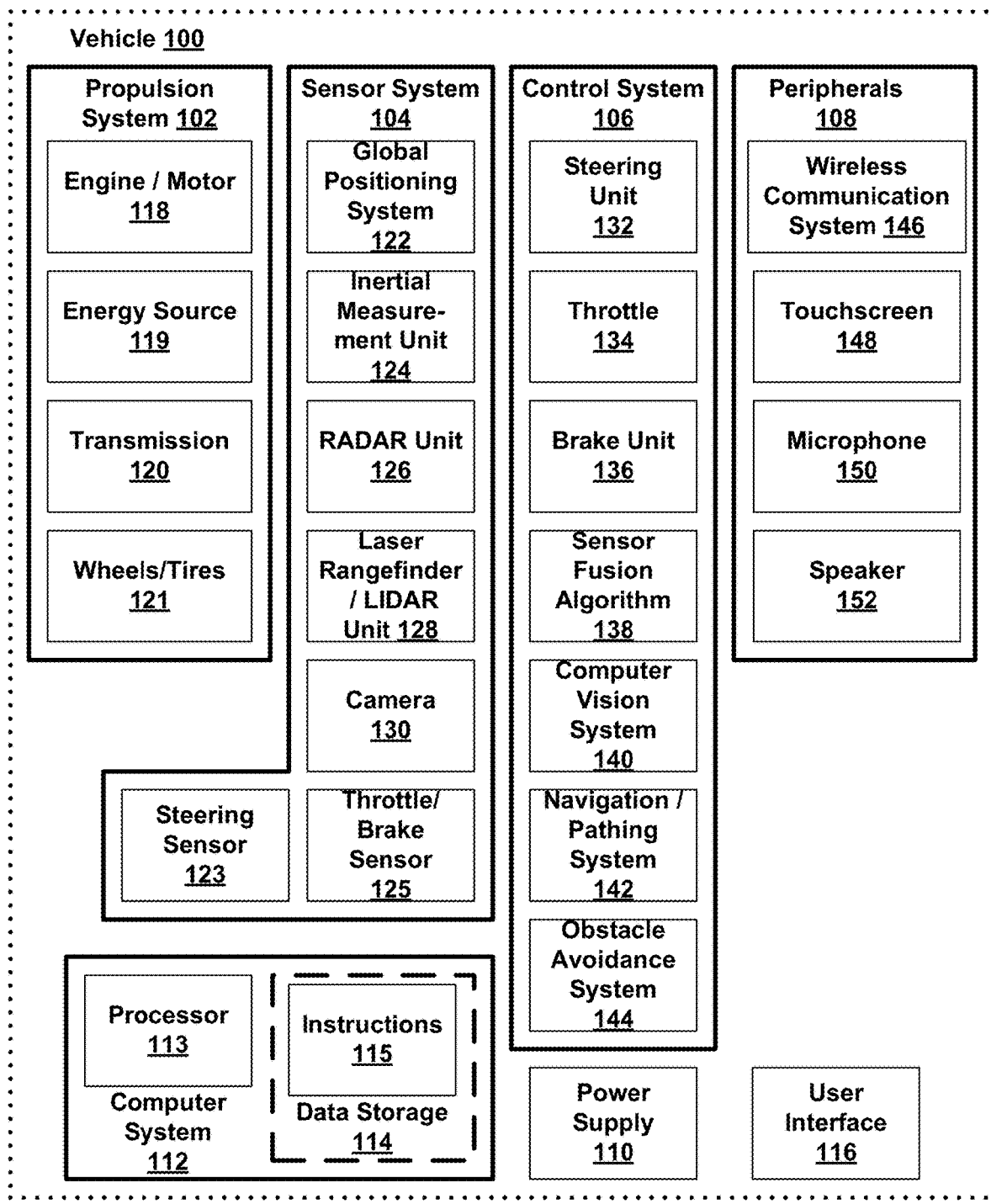
FIG. 1 is a functional block diagram illustrating a vehicle, according to an example implementation.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

A vehicle can be configured to operate in an autonomous mode in which the vehicle navigates through an environment with little or no input from a driver. Such an autonomous vehicle can include an image capture device (e.g., one or more cameras) configured to generate image data that provides information about the environment in which the vehicle operates. A computing system of the vehicle may use the image data generated by the image capture device as a basis for operating the vehicle in an autonomous mode.

In some situations, however, quality of image data generated by an image capture device may degrade in some way due to external light encountered by the image capture device. For example, when the autonomous vehicle is stopped at an intersection having a traffic signal, the image capture device may encounter sunlight of sufficient intensity to cause overexposure, to cause blooming and/or to degrade resolution of images being captured by the image capture device, among other possibilities. As a result, the computing system may be unable to use such images to determine a color or state of the traffic signal. This inability could, in turn, adversely affect subsequent autonomous operations.

Disclosed herein are methods and systems for controlling the extent of external light encountered or expected to be encountered by an image capture device of an autonomous vehicle, so as to help overcome the above-mentioned problems. In accordance with the disclosure, a vehicle may include a light-control feature that is adjustable by a computing system in order to proactively or reactively control the extent of light encountered by the image capture device. Consequently, the light-control feature could effectively be used to improve the quality of image data generated by an image capture device.

In some examples, the computing system could make a determination that quality of image data generated by an image capture device is or is expected to be lower than a threshold quality due to external light encountered or expected to be encountered by the image capture device. The computing system could make this determination in various ways. In one example, the computing system could evaluate image data recently captured by the image capture device, and could determine that its quality is threshold low due to external light. For instance, the computing system could determine that brightness of an image or portion of an image is threshold high. In another example, the computing system could use ephemeris data to estimate position of the sun relative to the image capture device's field of view when the vehicle arrives in a given location at a future time. Based on this estimated position of the sun, the computing system could then predict that the sun is expected to be positioned in the image capture device's field of view from the perspective of the image capture device, which often reduces image quality, and could thus determine that image quality is expected to degrade at the future time.

Once the computing system makes the above-mentioned determination, the computing system may responsively make an adjustment to the light-control feature in order to control the extent of external light encountered or expected to be encountered by the image capture device. Generally, this adjustment could be carried out in a way that causes quality of image data generated by the image capture device to increase, such as to a level that is higher than the threshold quality. For instance, if quality of image data generated by the image capture device is already determined to be lower than the threshold quality, then the adjustment could effectively increase quality of image data from being lower the threshold quality to being higher than the threshold quality. If quality of image data generated by the image capture device is currently higher than the threshold, but is expected to fall below the threshold quality at a future time, then the adjustment could help prevent the quality from falling below the threshold.

To help facilitate aspects of the present disclosure, any feasible light-control feature could be used. For instance, a light-control feature could be a wiper blade, such as a wiper blade positioned on outside of a space that includes the image capture device. In a specific example, the wiper blade could be coupled to an outside portion of a semi-transparent housing within which the image capture device is disposed. And in another example, the image capture device could positioned in an interior portion of a vehicle (e.g., behind a rear view mirror and proximate to a front windshield of the vehicle) and the wiper blade could be coupled to the front windshield on an exterior portion of the vehicle. Additionally or alternatively, a light-control feature could be a light-control device having adjustable light transmission properties (e.g., an electrochromic device), and the image capture device may obtain images of the environment through that light-control device (e.g., through an electrochromic window).

As such, if the light-control feature is a wiper, then the computing system could adjust position of the wiper relative to the image capture device and relative to a light source generating external light, so as to control the extent of external light encountered by the image capture device. For example, the computing system could move the wiper incrementally across the image capture device's field of view until the wiper blocks at least a portion of the sunlight being encountered by the image capture device, thereby reducing glare and improving quality of image data being generated. And if the light-control feature is the light-control device, then the computing system could adjust light transmission properties of the light-control device, so as to control the extent of external light encountered by the image capture device. For example, the computing system could reduce transmissivity of an electrochromic window in order to reduce the extent of light being encountered by the image capture device, which could also reduce glare and improve quality of image data being generated. Other examples are also possible.

II. Example Vehicle Systems and Operations

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some implementations, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within implementations. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some implementations, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some implementations, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other implementations, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the implementation, computer system 112 could be operable to monitor many aspects of vehicle 100 and its subsystems. In some implementations, computer system 112 may disable some or all functions of the vehicle 100 based on signals received from sensor system 104.

The components of vehicle 100 could be configured to work in an interconnected fashion with other components within or outside their respective systems. For instance, in an example implementation, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some implementations, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
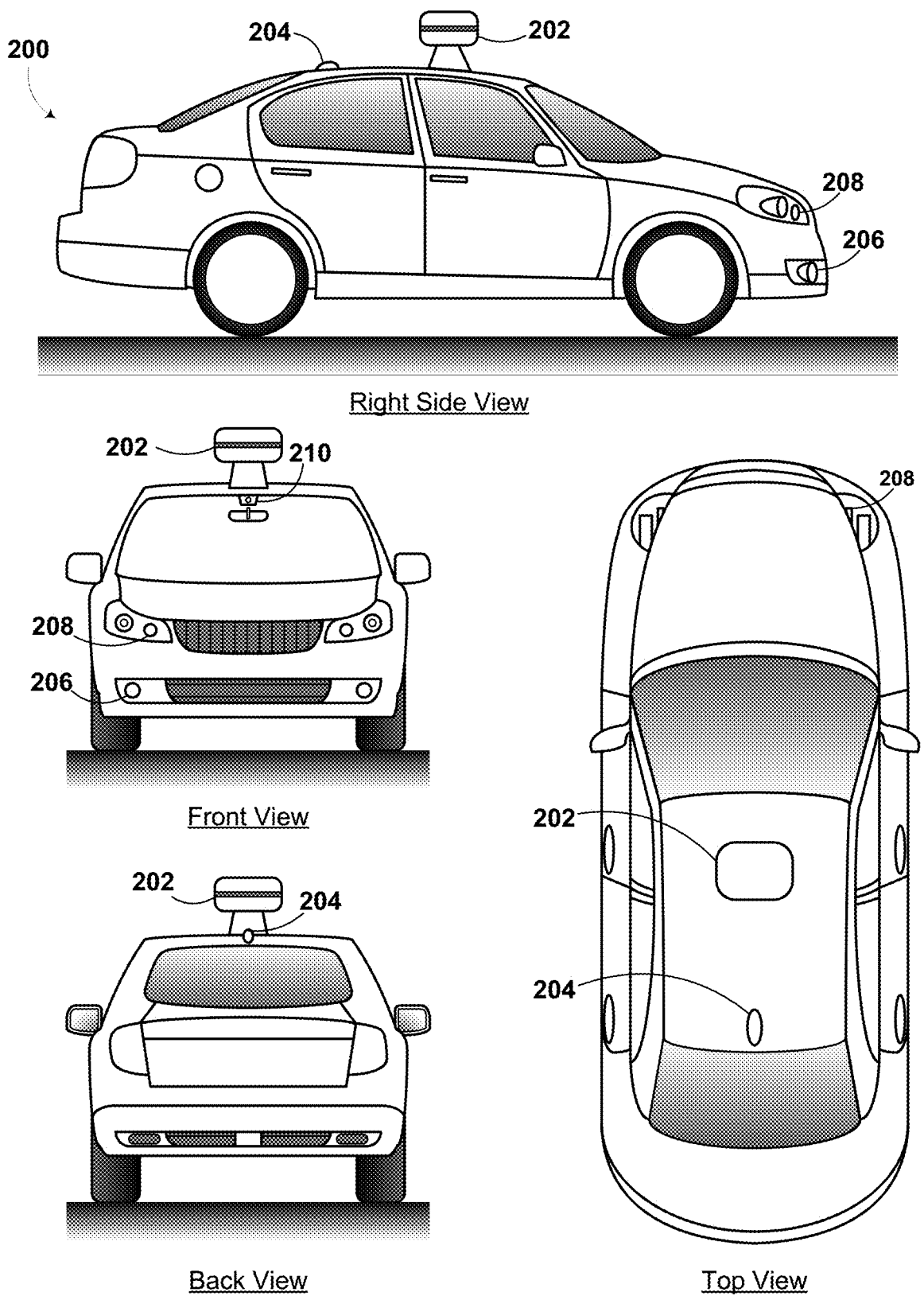
FIG. 2 is a conceptual illustration of a physical configuration of a vehicle, according to an example implementation.

FIG. 2 depicts an example physical configuration of vehicle 200, which may represent one possible physical configuration of vehicle 100 described in reference to FIG. 1. Depending on the implementation, vehicle 200 may include sensor unit 202, wireless communication system 204, radio unit 206, deflectors 208, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around the vehicle 200. The movable mount of sensor unit 202 may also be moveable in a scanning fashion within a particular range of angles and/or azimuths.

In some implementations, sensor unit 202 may include mechanical structures that enable sensor unit 202 to be mounted atop the roof of a car. Additionally, other mounting locations are possible within examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking (front-facing) view with respect to vehicle 200, but other mounting locations (including movable mounts) and viewing angles of camera 210 are possible within implementations. For instance, camera 210 could be positioned within the vehicle so that the camera captures images of the environment of vehicle 200 through a windshield of vehicle 200.

In some examples, camera 210 may correspond to one or more visible light cameras. Alternatively or additionally, camera 210 may include infrared sensing capabilities. Camera 210 may also include optics that may provide an adjustable field of view. Other examples are also possible.

Figure 3:
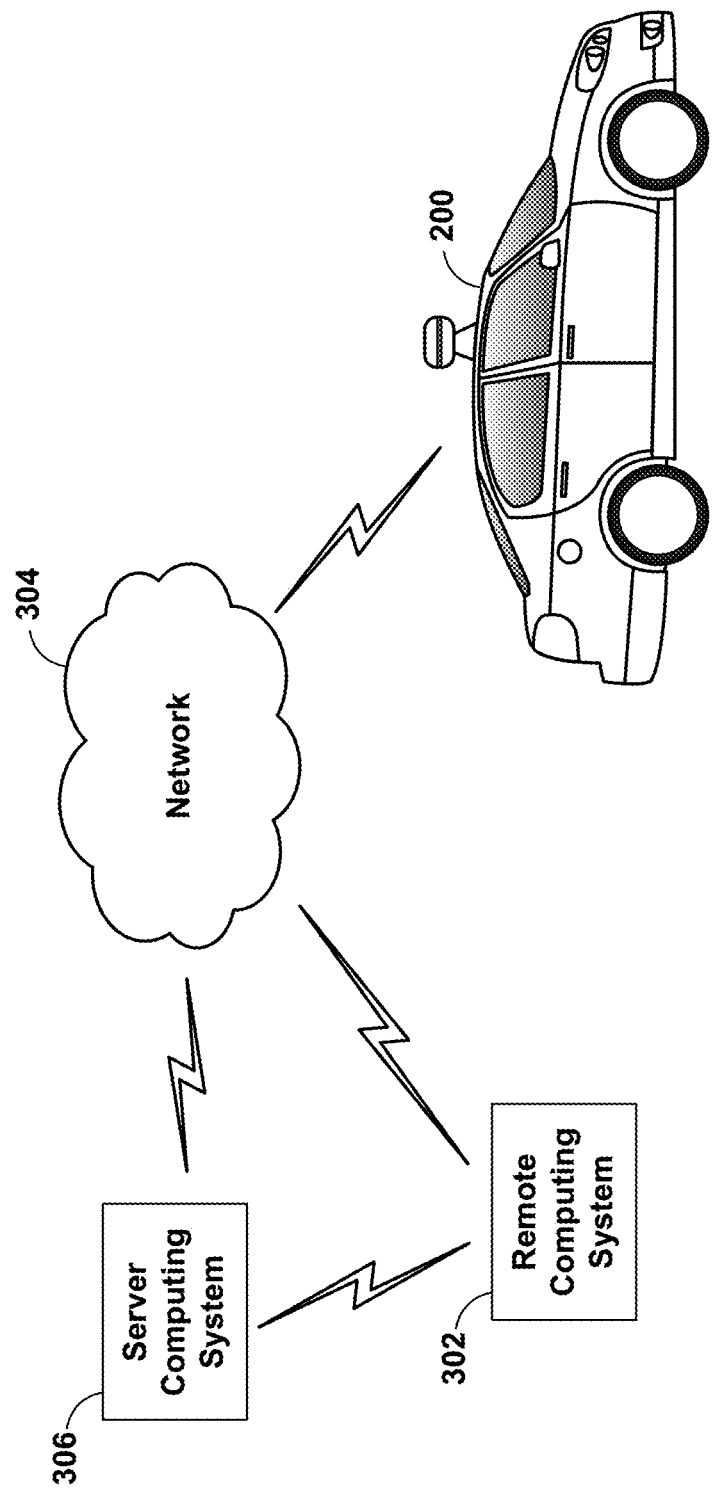
FIG. 3 is a conceptual illustration of wireless communication between various computing systems related to an autonomous vehicle, according to an example implementation.

FIG. 3 is a conceptual illustration of wireless communication between various computing systems related to an autonomous vehicle, according to an example implementation. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touch screen operable by the passenger of vehicle 200.

In some implementations, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, or perhaps server computing system 306, or a computing system local to vehicle 200) may operate to use a camera to capture images of the environment of an autonomous vehicle. In general, at least one computing system will be able to analyze the images and possibly control the autonomous vehicle.

In some implementations, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some implementations, the vehicle may have more than one camera positioned in different orientations. Also, in some implementations, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., light, such as that from a gas or diode laser, or other possible light source) that will be reflected by a target objects near the vehicle. The laser range finder may be able to capture the reflected electromagnetic (e.g., laser) signals. The captured reflected electromagnetic signals may enable the range-finding system (or processing system) to determine a range to various objects. The range-finding system may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an emergency vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some implementations it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one implementation, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various way depending on the source of the environment data. In some implementations, the environment data may come from a camera and be image or video data. In other implementations, the environment data may come from a LIDAR unit. The vehicle may analyze the captured image or video data to identify objects in the image or video data. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other implementations, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some implementations, the vehicle may react as if the detected object is present despite the low confidence level. In other implementations, the vehicle may react as if the detected object is not present.

When the vehicle detects an object of the environment, it may also calculate a confidence associated with the specific detected object. The confidence may be calculated in various ways depending on the implementation. In one example, when detecting objects of the environment, the vehicle may compare environment data to predetermined data relating to known objects. The closer the match between the environment data to the predetermined data, the higher the confidence. In other implementations, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some implementations, via a server (e.g., server computing system 306). The human operator of the remote computing system may in turn use the environment data as a basis for responding to the request.

In some implementations, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other implementations, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

III. Example Camera Systems and Operations

Figure 4A:
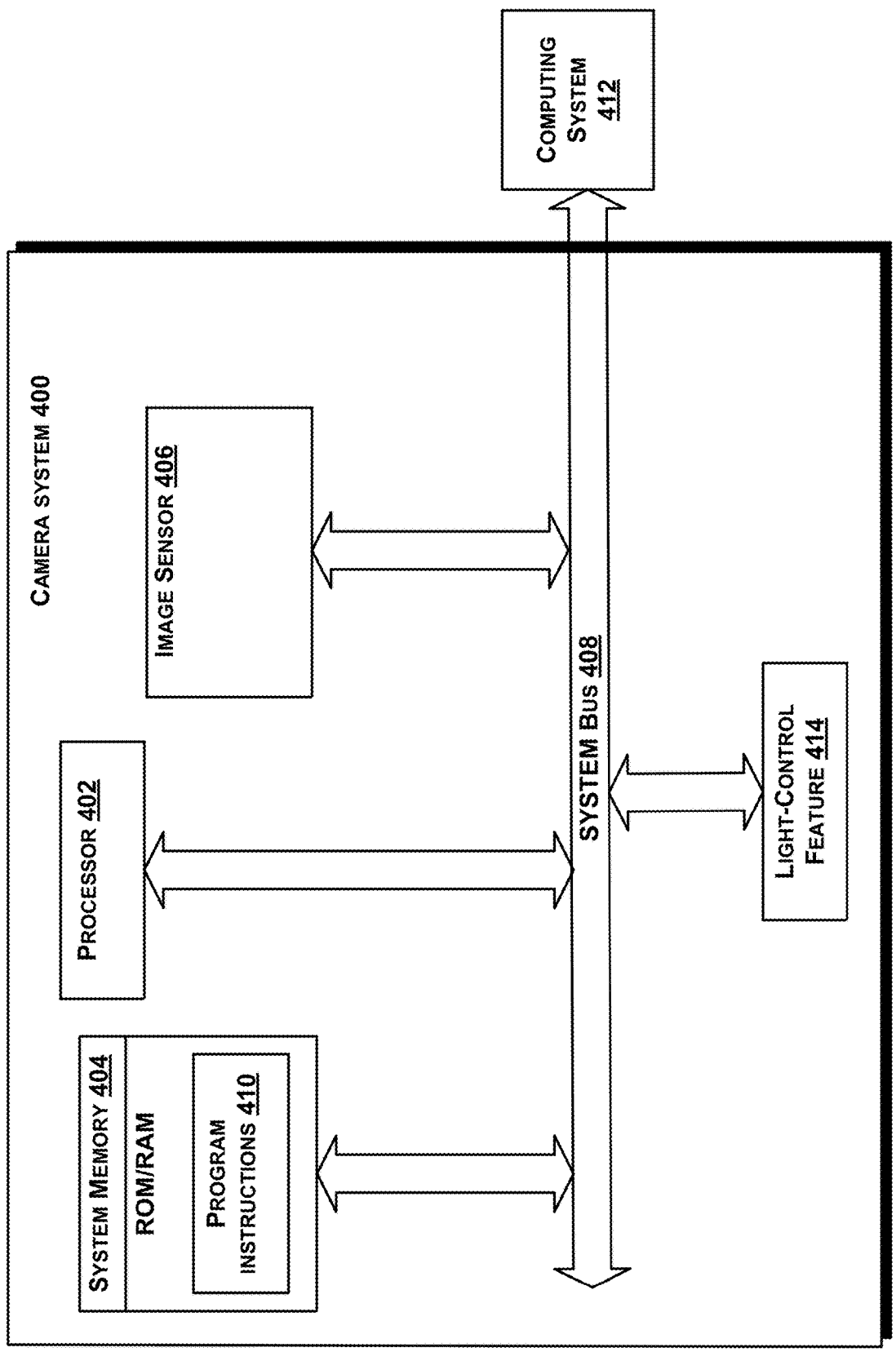
FIG. 4A is a simplified block diagram depicting example components of an example camera system.

FIG. 4A shows a simplified block diagram depicting example components of an example camera system 400. This example camera system 400 could correspond to camera 130. Also, although various components of camera system 400 are shown as distributed components, it should be understood that any of such components may be physically integrated and/or distributed according to the desired configuration of the computing system.

Camera system 400 may include at least one processor 402 and system memory 404. In an example embodiment, camera system 400 may include a system bus 408 that communicatively connects processor 402 and system memory 404, as well as other components of camera system 400. Depending on the desired configuration, processor 402 can be any type of processor including, but not limited to, a microprocessor (μP), a microcontroller (μC), a digital signal processor (DSP), or any combination thereof. Furthermore, system memory 404 can be of any type of memory now known or later developed including but not limited to volatile memory (such as RAM), non-volatile memory (such as ROM, flash memory, etc.) or any combination thereof. In some examples, the system memory 404 may be a memory cache to temporarily store image data.

An example camera system 400 may include various other components as well. For example, the camera system 400 includes an image sensor 406. The image sensor 406 may be an image sensor such as described herein. For instance, the image sensor 406 may include a rolling shutter and be configured to have portions selectively enabled or disabled by the processor 402. Additionally, the camera system 400 may include program instructions 410 that are stored in system memory 404 (and/or possibly in another data-storage medium) and executable by processor 402 to facilitate the various functions described herein.

Further, the camera system 400 may be coupled to an external computing system. The external computing system 412 may be a computing system located in a different portion of the autonomous vehicle and/or located at a remote computer server. For instance, external computing system 412 could be computing system 112. In any case, the computing system 412 may control various operations of the camera system 400, among other options.

According to example embodiments, the camera system 400 could also include a light-control feature 414 that is adjustable to control an extent of external light encountered by the camera system 400 (e.g., by the image sensor 406). As further described herein, the light-control feature 414 could be a mechanical device, such as a wiper for instance. Additionally or alternatively, the light-control feature 414 could be light-control device having adjustable light transmission properties, such as an electrochromic device (e.g., an electrochromic window) or a variable liquid-crystal display (LCD). Moreover, the light-control feature 414 could be controlled by a computing system, such as by computing system 412 for instance. Other arrangements are also possible.

Figure 4B:
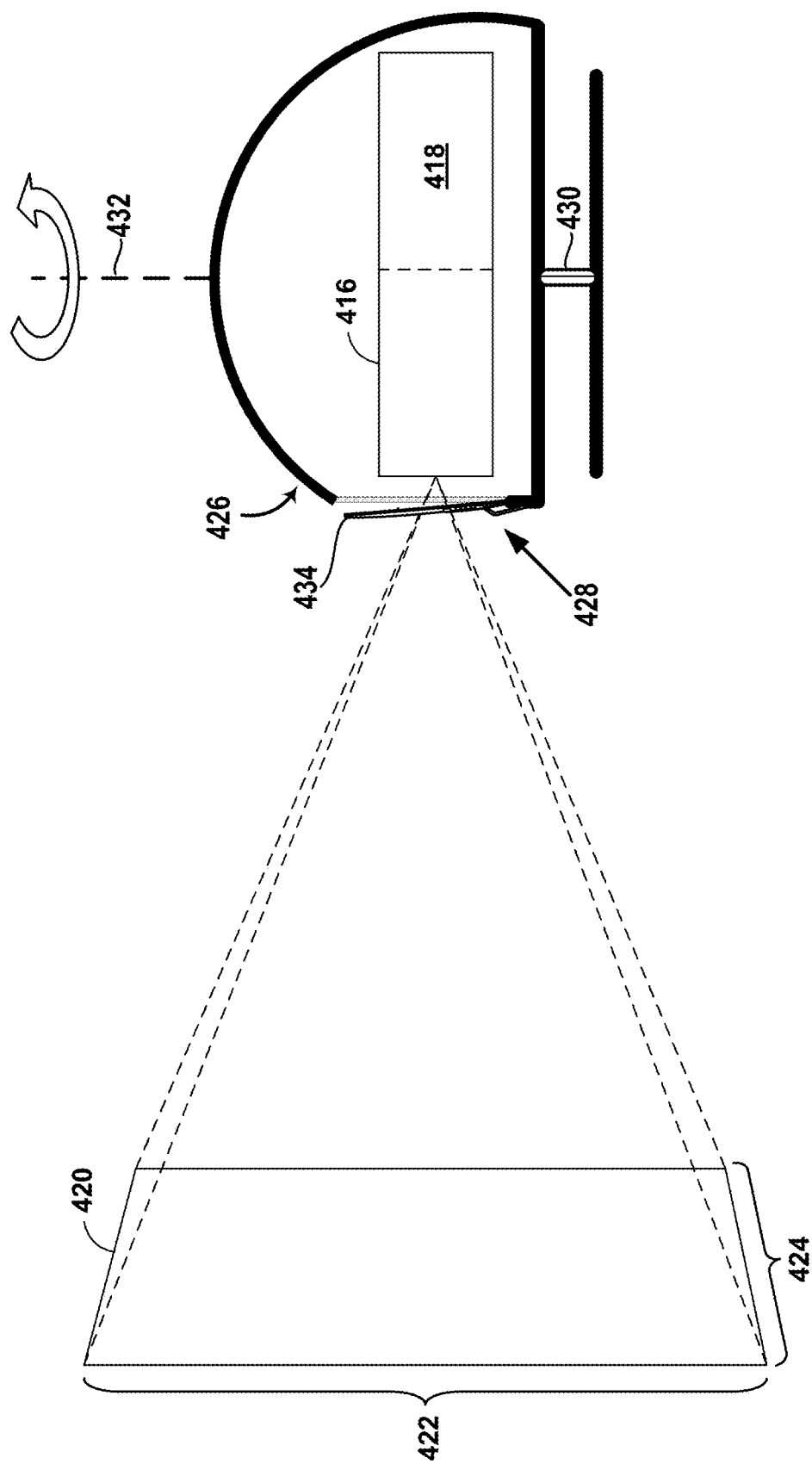
FIG. 4B illustrates an arrangement of a camera and a wiper, according to an example implementation.
Figure 4C:
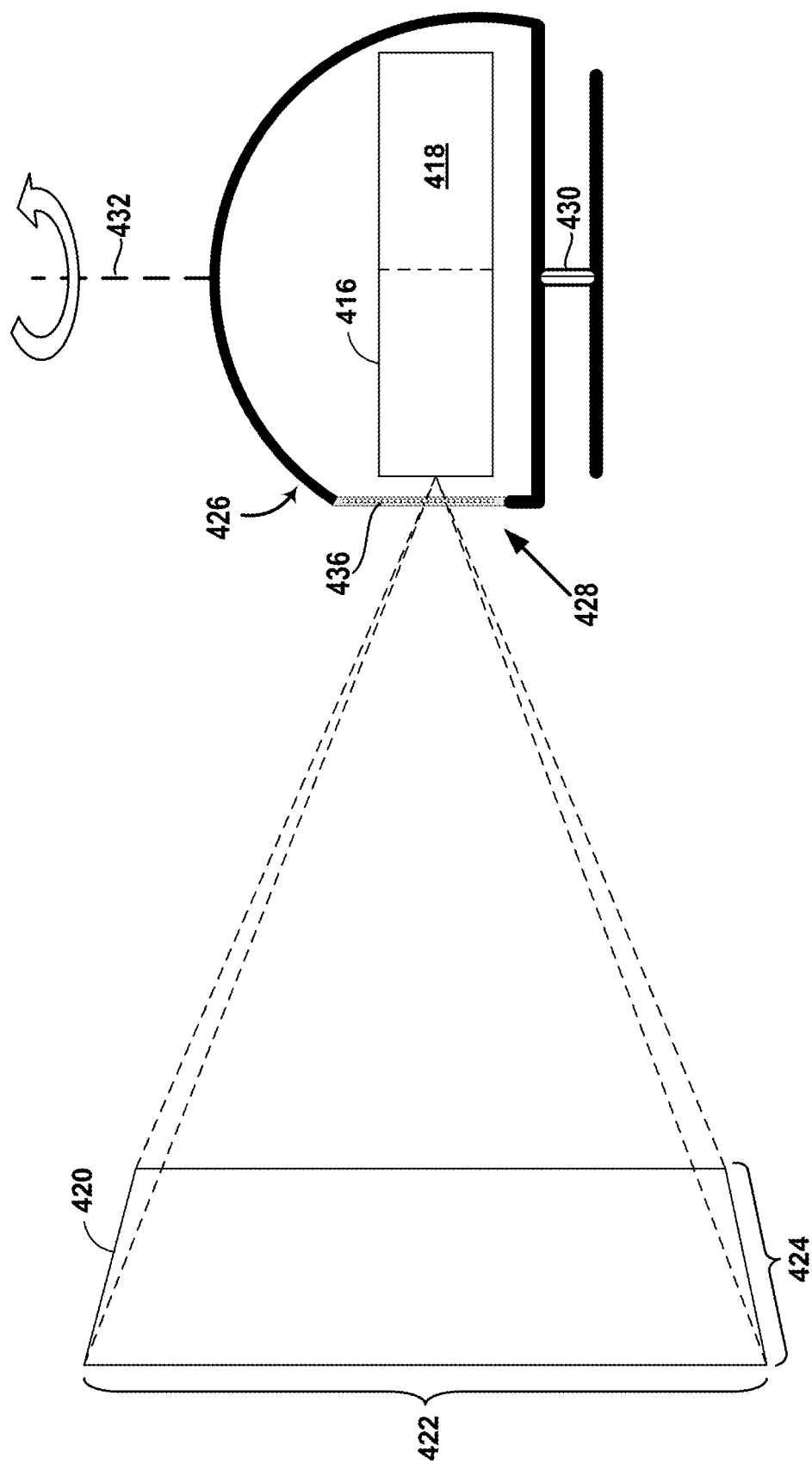
FIG. 4C illustrates an arrangement of a camera and an electrochromic window, according to an example implementation.

FIGS. 4B and 4C next illustrate example arrangements of a camera and a light-control feature.

As an initial matter, FIGS. 4B and 4C each respectively illustrate an imaging operation of an apparatus that includes an optical system 416 (e.g., a lens) and an image sensor 418. The image sensor 418 could be in a camera, such as camera system 400 shown in FIG. 4A. The optical system 416 provides an overall field of view 420 to the image sensor 418. The overall field of view 420 includes a vertical field of view 422 and a horizontal field of view 424. The overall field of view 420 corresponds to the largest angular extent that the image sensor 418 can image via the optical system 416.

Additionally, FIGS. 4B and 4C each respectively illustrate that the optical system 416 and the image sensor 418 could be disposed within a housing 426. The housing 426 is shown to include an aperture 428 (e.g., a transparent aperture) through which the image sensor 418 could capture images of the vehicle's environment. Additionally, the housing 426 could be coupled to a rotating platform 430, which may rotate about axis 432, thereby also causing rotation of the housing 426, the optical system 416, and the image sensor 418. In this way, the image sensor 418 to capture images of various portions of the vehicle's environment.

In another implementation, however, any one of the optical system 416, image sensor 418, and the housing 426 may be substantially fixed (e.g., to a part of a vehicle), and thus may not necessarily rotate about an axis. For example, the image sensor 418 may be fixed to the vehicle, so as to obtain images of certain portion(s) of the vehicle's environment. Other implementations are also possible.

In line with the present disclosure, FIGS. 4B and 4C also illustrate light-control features. For example, FIG. 4B illustrates a wiper 434, which is coupled to an outside portion of the housing 426, and specifically nearby the aperture 428. With this arrangement, a computing system could adjust position of the wiper 434 relative to the image sensor 418 (e.g., adjust position of the wiper 434 relative to the field of view 420), so as to control the extent of external light encountered by the image sensor 418 and/or by the optical system 416. In another example, FIG. 4C illustrates an electrochromic window 436 that is incorporated within the aperture 428, thereby causing the image sensor 418 to capture images of the environment through the electrochromic window 436. And as further discussed herein, the electrochromic window 436 may have adjustable light transmission properties. With this arrangement, a computing system could adjust light transmission properties of the electrochromic window 436, so as to control the extent of external light encountered by the image sensor 418. Other illustrations are also possible.

IV. Controlling Extent of Light Encountered by an Image Capture Device of a Vehicle In line with the discussion above, an image capture device may be any device capable of generating image data representative of an environment (e.g., capture image(s) of the environment), such as of an environment around a vehicle (e.g., vehicle 100), for instance. Generally, an image capture device could be or could otherwise be referred to as a camera (e.g., camera 130), a camera system (e.g., camera system 400), and/or an image sensor (e.g., image sensor 406), among other options. Moreover, an image capture device could be coupled to a vehicle in any feasible manner, such as using the arrangements described herein, among others.

In some situations, as noted, quality of images captured by an image capture device may degrade due to external light encountered by the image capture device, which may prevent the image capture device from generating image data of sufficient quality to be used as basis for autonomous operation of the vehicle. Generally, this external light could be generated or otherwise arrive from any feasible external light source or light reflector. For example, the external light could be sunlight from the sun, artificial light from a lamp (e.g., street lamp), laser light generated by another vehicle's LIDAR system, and/or light reflected off another vehicle (e.g., off the other vehicle's mirror), among other possibilities. Moreover, the external light could be of any wavelength in the electromagnetic spectrum, and could thus be visible light or non-visible light. In any case, external light could degrade quality of image(s) in various ways.

For example, the image capture device may encounter blooming, which is a phenomenon where excessive light could cause bright patches in an image (e.g., light streaks out from a light source captured in the image due to a significant charge at a given pixel). In another example, the image capture device may encounter stray light, which is light that travels through an optical system of the image capture device in a way that was not intended in the design (e.g., false light increasing a signal measured at some wavelengths). In yet another example, the image capture device may encounter glare, which is generally a phenomenon where high-intensity light impairs visibility of features in an image. In yet another example, the image capture device may encounter lens flare, which is a phenomenon where light is scattered or flared in an optical system of the image capture device, thereby producing undesirable effects on an image. In yet other examples, the image capture device may encounter oversaturation, overexposure, underexposure (e.g., underexposure of an area of interest in an image due to sunlight-triggered auto exposure settings), and/or degradation in image resolution, among other possibilities.

Figure 5A:
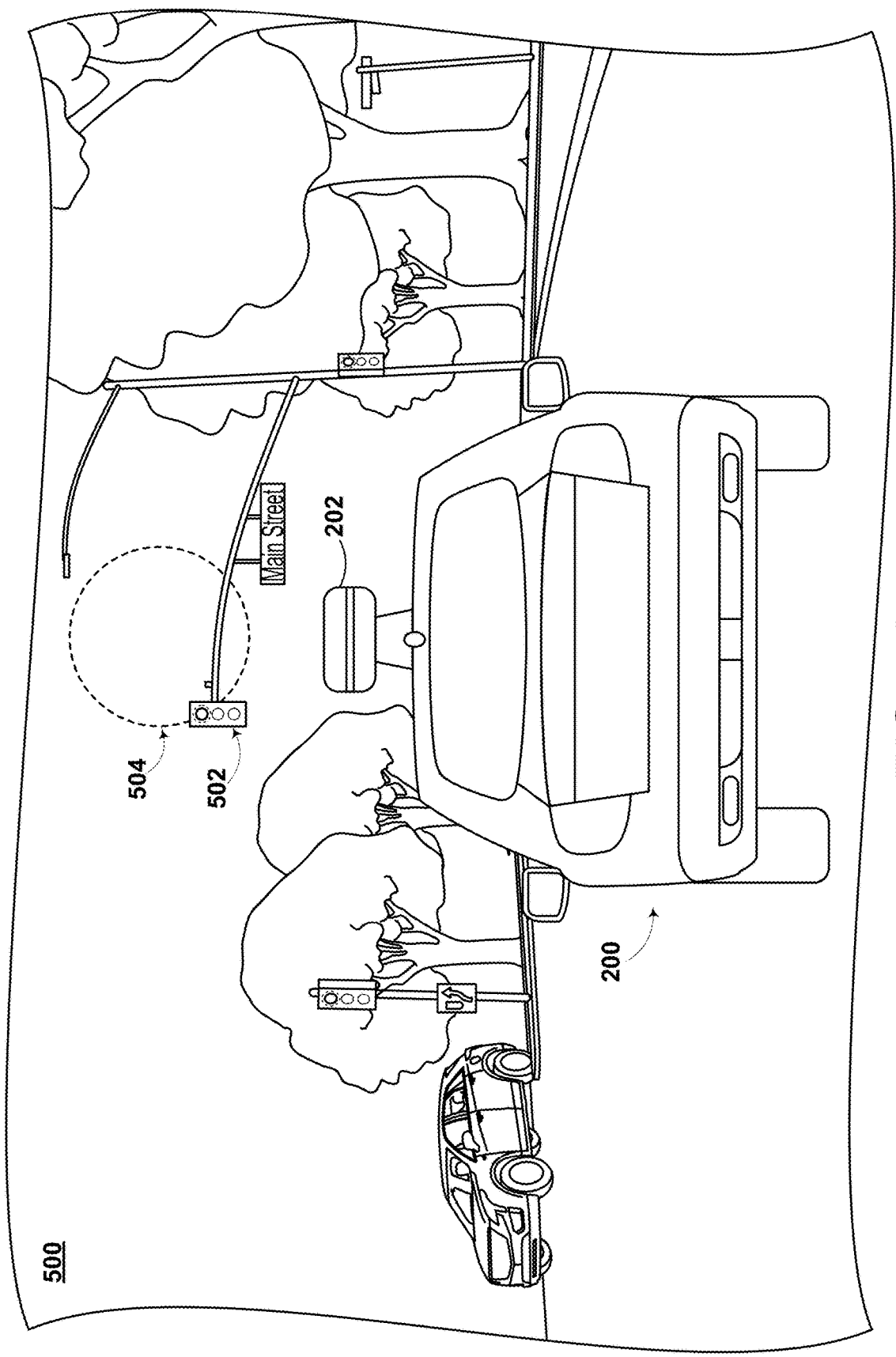
FIG. 5A illustrates an autonomous vehicle near a traffic signal.
Figure 5B:
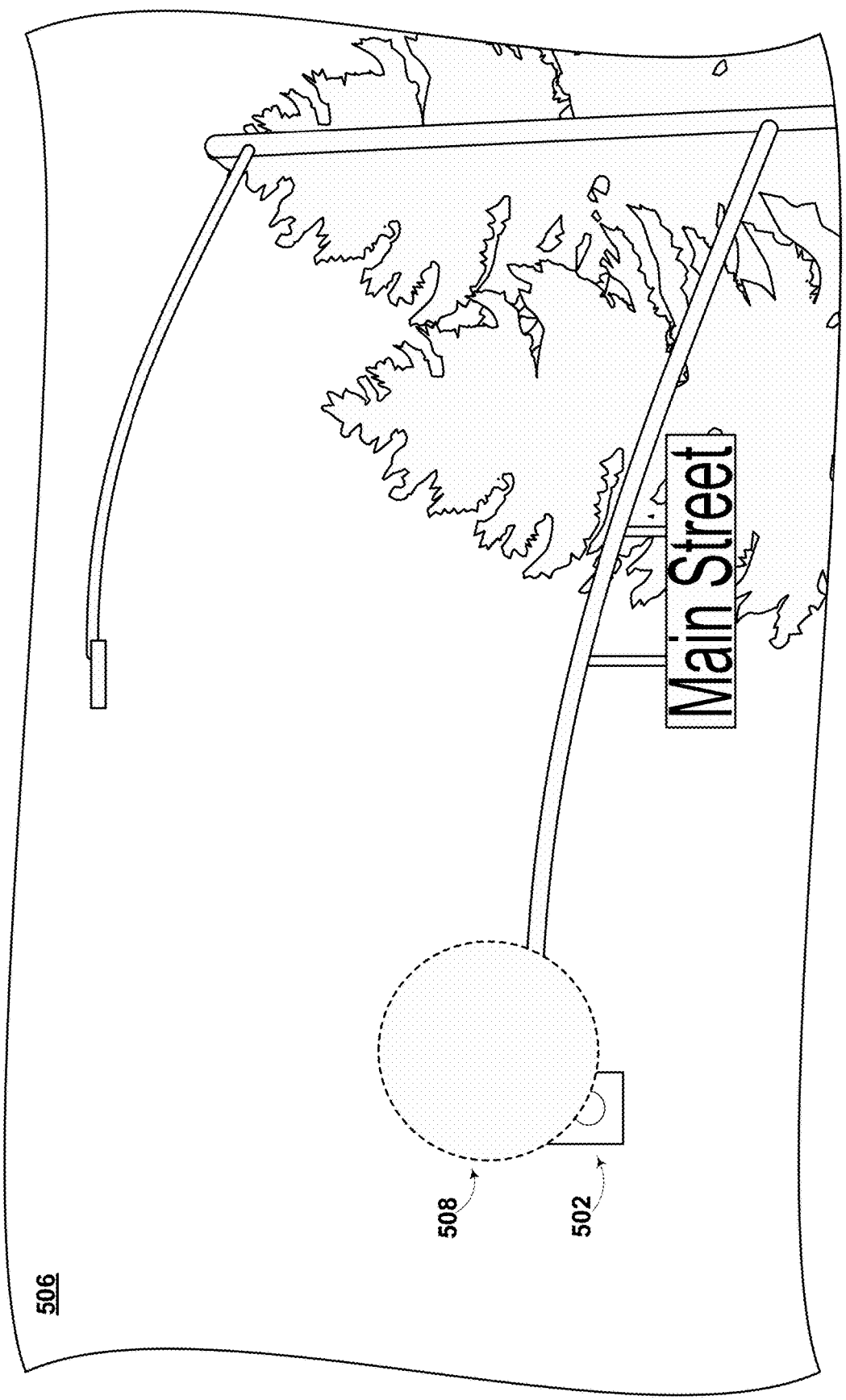
FIG. 5B illustrates sunlight glare obscuring details of the traffic signal from the perspective of an image capture device of the autonomous vehicle.

FIGS. 5A-5B illustrate an example of a situation in which external light could prevent an image capture device of an autonomous vehicle from capturing images of sufficient quality to be used as basis for autonomous operation of the vehicle.

FIG. 5A shows a situation where the vehicle 200 arrives at an intersection 500 having a traffic signal 502. In this situation, a computing system of the vehicle 200 may operate an image capture device, such as a front-facing camera of the sensor unit 202, to capture image(s) of the intersection 500. Once image(s) are captured, the computing system may attempt to use the captured image(s) as basis for determining a color or state of the traffic signal 502 and thus as basis for determining subsequent autonomous operations that the vehicle should carry out at the intersection 500. For instance, as shown in FIG. 5A, a top light (e.g., red light) of the traffic signal 502 is emitting light, but the middle and bottom lights of the traffic light 502 are not emitting light, thereby serving as an indication that vehicle(s) should stop at that part of the intersection 500. As such, the computing system may attempt to use the captured image(s) as basis for determining whether or not the top light of the traffic signal 502 is emitting light and thus whether the computing system should operate the vehicle 200 to stop at the intersection 500.

Unfortunately, however, the position of the sun 504 from the perspective of the vehicle's image capture device may prevent the image capture device from capturing an image of the traffic signal 502 that is of sufficient quality to be used as basis for determining a color or state of the traffic signal 502. In particular, as shown, the sun 504 is positioned substantially proximate to or behind the traffic signal 502 from the perspective of the image capture device (e.g., in the field of view of the front-facing camera of the sensor unit 202). This situation may cause the image capture device to encounter sunlight of sufficient intensity to cause blooming and/or to degrade image resolution, among other options. As a result, the image capture device may not be able to capture image(s) of the traffic signal 502 that are of sufficient quality to be used as basis for determining a color or state of the traffic signal 502.

For instance, FIG. 5B illustrates an example of an image 506 captured by the vehicle's image capture device during the above-described situation. As shown, the traffic signal 502 is not fully visible in the image 506 due to an image artifact 508, which is caused by the sun 504 being positioned in the field of view of the image capture device and being positioned behind or substantially proximate to the traffic signal 502 from the perspective of the image capture device. So if the computing system attempts to use the captured image 506 as basis for determining a color or state of the traffic signal 502, the computing system may not be able to use the image 506 as basis for determining that the top light of the traffic signal 502 is emitting light. Consequently, the computing system may not determine that vehicle 200 should stop at the intersection 500 or may experience a delay in determining that vehicle 200 should stop at the intersection 500 or may determine that the vehicle should stop as a default if it cannot determine with sufficient confidence the traffic signal state, which may then prevent the computing system from timely operating the vehicle 200 to stop or otherwise as expected at the intersection 500, among other undesirable outcomes.

Generally, an autonomous vehicle could additionally or alternatively encounter various other scenarios (not shown) in which external light prevents the image capture device from capturing images of sufficient quality to be used as basis for autonomous operation of the vehicle. For example, the position of the sun from the perspective of the vehicle's image capture device may prevent the image capture device from capturing an image of a traffic signal that is of sufficient quality to be used as basis for determining that a bottom light (e.g., green light) of the traffic signal is emitting light. Given this, the computing system may not determine that vehicle can travel through the intersection and may instead cause the vehicle to stop at the intersection as a precautionary measure, which may lead to travel delays, among other effects. In yet another example, the position of the sun from the perspective of the vehicle's image capture device may prevent the image capture device from capturing an image of a traffic signal that is of sufficient quality to be used as basis for determining that a particular turn signal is emitting light. Given this, the computing system may not determine that vehicle can turn at the intersection in a direction corresponding to the particular turn signal and may instead cause the vehicle to unnecessarily delay the turn or continue travel along a different and perhaps longer route. Other examples are also possible.

Disclosed herein are methods and systems for proactively and/or reactively controlling the extent of light encountered by an image capture device of a self-driving vehicle, which may allow the image capture device to capture images of sufficient quality. As a result, this image data could be used as basis for autonomously operating the vehicle.

In accordance with the disclosure, a vehicle could be equipped with a light-control feature that is adjustable by a computing system in order to proactively or reactively control the extent of light encountered by the image capture device. Although certain light-control features are described herein by way of example, other light-control features are possible as well without departing from the scope of the present disclosure.

In one case, the light-control feature could be a mechanical device that is movable relative to the image capture device, such as relative to the field of view of the image capture device, among other possibilities. For instance, as further discussed herein, the mechanical device could be positioned in the field of view of the image capture device so as to block an external light source (e.g., the sun) from the perspective of the image capture device, thereby reducing extent of external light encountered by the image capture device. Generally, any feasible mechanical device could be used and that mechanical device could be coupled to the vehicle in any feasible manner.

By way of example, the mechanical device at issue could be a wiper, such as a wiper device typically used to remove rain, snow, ice and/or debris from a windscreen or windshield (e.g., of a vehicle). For instance, the wiper may include an arm (e.g., a metal arm) that pivots at one end and may also include a wiper blade (e.g., rubber blade) attached to the arm. The arm could be powered by a motor (e.g., an electric motor), which could be operable by the computing system of the vehicle, so as to move the arm. With this arrangement, the computing system could operate the wiper to move in any feasible manner and at any feasible speed, such as by moving the wiper back and forth at a particular speed over glass of a windshield, for instance. In this example, the wiper could be coupled to the vehicle in various ways.

In one arrangement, the wiper could be positioned proximate to a windshield of the vehicle, such as proximate to a front or a back windshield of the vehicle, and optionally also could be used to remove rain, snow, ice and/or debris from that windshield. In this arrangement, the image capture device could be positioned within the vehicle so that the image capture device can capture images of the environment of vehicle 200 through the windshield. As a result, the computing system could operate the wiper so that the wiper moves relative to the image capture device, and specifically move relative to the field of view of the image capture device.

In another arrangement, the image capture device could be disposed within a housing that is coupled to the vehicle, and the wiper could be coupled to or otherwise be positioned proximate to that housing. For example, the housing at issue could be a semi-transparent housing of a sensor unit (e.g., sensor unit 202) in which the image capture device is positioned. As such, the image capture device could capture images of the environment of vehicle 200 through a semi-transparent material of the housing. Nonetheless, in this arrangement, the wiper could be coupled to the housing or otherwise be positioned near the housing in a way that allows the computing system to cause a movement of the wiper relative to the image capture device, specifically in order to move the wiper relative to the field of view of the image capture device. Other arrangements are also possible.

In another case, the light-control feature could be a light-control device having adjustable light transmission properties, and the computing system could operate the light-control device. Specifically, the light-control device could be positioned in the field of view of the image capture device, so that the image capture device captures images of the vehicle's environment through the light-control device. With this arrangement, the computing system could adjust light transmission properties of the light-control device, and thus control the amount of light passing through the light-control device. And by controlling the amount of light passing through the light-control device, the computing system may effectively control the extent of light encountered by the image capture device. Moreover, in some implementations, the computing system could selectively adjust light transmission properties of certain parts of the light-control device, which may effectively allow the computing system to control the extent of external light arriving from select regions in the field of view of the image capture device.

In this case, one or more of various light-control devices could be used. For example, the light-control device could be a "smart" glass whose light transmission properties can be altered when voltage, light and/or heat is applied. The smart glass could be an electrochromic device, a photochromic device, and/or a thermochromic device, among others. In the case of the electrochromic device, for instance, the computing system could cause the electrochromic device to change light transmission properties by applying an electrical signal, thereby controlling the amount of light passing through. In practice, changing the light transmission properties of the electrochromic device may involve changing the opacity of the electrochromic device between a transparent and a tinted (semi-transparent) state. Other examples are also possible.

Furthermore, the light-control device could be coupled to the vehicle in any feasible manner. For example, the above-mentioned smart glass could be incorporated within or otherwise replace a windshield of the vehicle, and the image capture device could be positioned within the vehicle so that the image capture device can capture images of the environment of vehicle 200 through the smart glass. In another example, the smart glass could be incorporated within or otherwise replace a material of a housing, and the image capture device could be disposed within the housing, so that the image capture device could capture images of the vehicle's environment through the smart glass in the housing. Other examples are also possible.

In a system arranged as described above, the computing system could detect a trigger to make an adjustment to a light-control feature. Generally, detecting the trigger could involve making a determination that quality of image data generated by an image capture device is or is expected to be lower than a threshold quality due to external light encountered or expected to be encountered by the image capture device. The computing system could make this determination in various ways.

In one case, the computing system could make the above-mentioned determination by using image analysis techniques to evaluate characteristics of a captured image (e.g., a recently captured image), thereby effectively assessing the quality of that image. Image analysis technique may involve use of machine learned classifiers, deep neural networks, image statistics evaluation, and/or handcrafted feature evaluation, among others.

For example, the computing system could make the determination by determining that a captured image exhibits characteristics of blooming, such as by determining that the image includes a light streak taking the form of a bright column of pixels, for instance. In another example, the computing system could make the determination by determining saturation in a captured image. In another example, the computing system could make the determination by determining that an exposure level in a captured image is above a first threshold exposure level or by determining that an exposure level in a captured image is below a second threshold exposure level (e.g., could be the same as or different from the first threshold exposure level). In yet another example, the computing system could make the determination by determining that an image resolution level in a captured image is lower than threshold resolution level. Other examples are also possible.

In another case, the computing system could make the above-mentioned determination by determining that a captured image is not usable for detection and/or identification of an object. For example, the image capture device could capture an image of a vehicle's environment, and the computing system may make a particular determination that the image data representative of that image does not provide information that the computing system can use as basis for detecting and/or identifying an object in the environment. As such, this particular determination could correspond to the above-mentioned determination that quality of image data generated by an image capture device is lower than a threshold quality, possible due to external light encountered by the image capture device.

In yet another case, the computing system could make the above-mentioned determination by evaluating sensor data received from one or more sensors other than the image capture device. For example, the vehicle could be equipped with a light sensor that provides information about intensity and direction of arrival of external light, and that light sensor could be positioned substantially proximate to the image capture device. With this arrangement, the computing system could make a particular determination that data from the light sensor is representative of light intensity/direction that is expected to or is otherwise known to cause the image capture device to generate image data of insufficient quality. As such, this particular determination could correspond to the above-mentioned determination that quality of image data generated by an image capture device is lower than a threshold quality due to external light encountered by the image capture device.

In yet another case, the computing system could make the above-mentioned determination by determining that the vehicle encountered a situation in which the image capture device cannot or is unlikely to generate image data of sufficient quality. For instance, the computing system could make the determination by determining that a light source is or is expected to be within a field of view of the image capture device, and possibly that the light source is or is expected to be proximate to an object from a perspective of the image capture device. The computing system could do so in various ways.

For example, the computing system could receive and use ephemeris data to determine the sun's position in the sky over a given location at a given time. Given the sun's position over the given location at the given time, the computing system could then determine or predict the sun's position relative to the image capture device's field of view if the vehicle is travelling or is expected to travel in the given location within the geographic area at the given time. Accordingly, the computing system could use this approach to determine or predict that the sun is or is expected to be within a field of view of the image capture device. Moreover, based on a known location of an object (e.g., a traffic signal) at the given location, the computing system could further determine that the sun is or is likely to be proximate to the object at issue from a perspective of the image capture device. Other examples are also possible In yet another case, the computing system could make the above-mentioned determination by determining that the vehicle's location is one at which it is particularly important for the image capture device to generate image data of sufficient quality. To facilitate this, for instance, the computing system may have a list of locations (e.g., a list of intersections) that each have been designated as an "important location" and the computing system could refer to this list to determine that the vehicle is at a location where a light-control feature should be adjusted. As such, the vehicle's determined location could effectively be the trigger to make an adjustment to the light-control feature. Other cases are also possible.

Once the computing system detects a trigger to make an adjustment to the light-control feature, the computing system could responsively make an adjustment to the light-control feature. Generally, the computing system could make this adjustment so as to control the extent of external light encountered or expected to be encountered by the image capture device. For example, making the adjustment could be done to decrease the extent of external light encountered or expected to be encountered by the image capture device. This may be useful in a situation where the image capture device encounters or is expected to encounter a relatively high extent of external light, for instance. In another example, making the adjustment could be done to increase the extent of external light encountered or expected to be encountered by the image capture device. This may be useful in a situation where the image capture device encounters or is expected to encounter a relatively low extent of external light, for instance. Nonetheless, the adjustment could be carried out in various ways.

In one implementation, the adjustment to the light-control feature could be a predetermined adjustment. For instance, the computing system could adjust the light-control device to exhibit predetermined light transmission properties and/or could cause the mechanical device to move to predetermined position(s) relative to the image capture device (e.g., relative to the field of view of the image capture device). In this implementation, the predetermined adjustment could be arranged to cause the extent of encountered external light to exhibit characteristics (e.g., intensity) that can help lead to sufficient image quality. For example, the light-control feature could be adjusted to a predetermined setting that has been found to help prevent blooming and/or saturation, among other options. Other examples are also possible.

In another implementation, the adjustment to the light-control feature could be based on one or more factors. For instance, the computing system could adjust light transmission properties of the light-control device based on one or more factors and/or could cause the mechanical device to move to position(s) that are selected based on one or more factors. Generally, various factor(s) could be used as basis for the adjustment.

In one case, the adjustment to the light-control feature could be based on a position of an external light source from the perspective of the image capture device. In particular, the computing system could determine or estimate a position of an external light source from the perspective of the image capture device, such as by evaluating data from a light sensor, by evaluating recently captured images, and/or by evaluating ephemeris data (assuming that the external light source is the sun), among other options. And the computing system could then adjust the light-control feature based on the determined position of the external light source.

For example, the computing system could cause the mechanical device to move to a position that at least partially overlaps, from the perspective of the image capture device, with the determined position of the external light source, thereby causing the mechanical device to at least partially block the external light source from the perspective of the image capture device. In another example, the computing system could select a part of the light-control device that at least partially overlaps, from the perspective of the image capture device, with the determined position of the external light source, and could then adjust light transmission properties of the selected part (e.g., change opacity of the selected part to a tinted state), thereby at least partially blocking the external light source from the perspective of the image capture device. Other examples are also possible.

In another case, the adjustment to the light-control feature could be based on causing quality of image data generated by the image capture device to be higher than the threshold quality. In particular, the computing system could adjust the light-control feature to cause the extent of encountered external light to exhibit characteristics (e.g., intensity) that lead to certain target outcomes. Generally, these outcomes may include: (i) preventing captured image(s) from exhibiting characteristics of blooming, (ii) preventing captured image(s) from exhibiting characteristics of saturation, (iii) causing an exposure level in captured image(s) to decrease, such as to a level that is below the above-mentioned first threshold exposure level, (iv) causing an exposure level in captured image(s) to increase, such as to a level that is above the above-mentioned second threshold exposure level, and/or (v) causing an image resolution in captured image(s) to increase, such as to a level that is higher than the above-mentioned threshold resolution level.

By way of example, the computing system could determine that an exposure level in image(s) should decrease, such as to a level that is below the first threshold exposure level, for instance. The computing system could determine this target outcome in various ways, such as by evaluating recently captured image(s) and determining that an exposure level in recently captured image(s) is above the first threshold exposure level. Nonetheless, in this example, causing quality of image data to be higher than the threshold quality corresponds to a target outcome of decreasing an exposure level in image(s) to be captured, perhaps to a level that is below the first threshold exposure level. As such, the computing system could specifically adjust the light-control feature to a setting that decreases exposure level in captured image(s), and perhaps to a setting that causes the exposure level to be below the first threshold exposure level. For instance, the computing system could change opacity of the light-control device to decrease an exposure level, and perhaps could change opacity by an extent that causes the exposure level to be below first threshold exposure level. Other examples are also possible.

In either implementation, the computing system could operate the image capture device to generate image data during the adjustment, so as to ideally obtain at least one image that is of sufficient quality to be used as basis for autonomous operation of the vehicle. In particular, the computing system could operate the image capture device to capture a plurality of images during the adjustment. And given that a plurality of images is captured, there may be an increased likelihood of at least one of those images being of sufficient quality. For instance, an image could be considered as being of sufficient quality if the image does not exhibit characteristics of blooming and/or if important object(s) are visible in the image, among other considerations discussed herein. Nonetheless, assuming that at least one of the captured images ends up being of sufficient quality, the computing system could use at least image data corresponding to that image as basis for operating the vehicle.

In a specific example, the computing system could cause a wiper to move incrementally across the image capture device's field of view while the computing system operates the image capture device to capture a plurality of images. In turn, this may result in a plurality of images each showing the wiper in a different position within the image capture device's field of view. In this example, at least one particular image, from among the plurality of images, may be one in which the wiper blocks at least a portion of the external light source (e.g., sun) in the field of view of the image capture device. Ideally, that particular image may also be one in which object(s) (e.g., traffic signal(s)) are visible. For instance, the particular image may be one in which an important object (i) is not blocked by the wiper from the perspective of the particular image and (ii) is detectable and/or identifiable through evaluation of the particular image by the computing system. As such, the computing system could use at least the particular image as basis for operating the vehicle. Other examples are also possible.

Figure 6A:
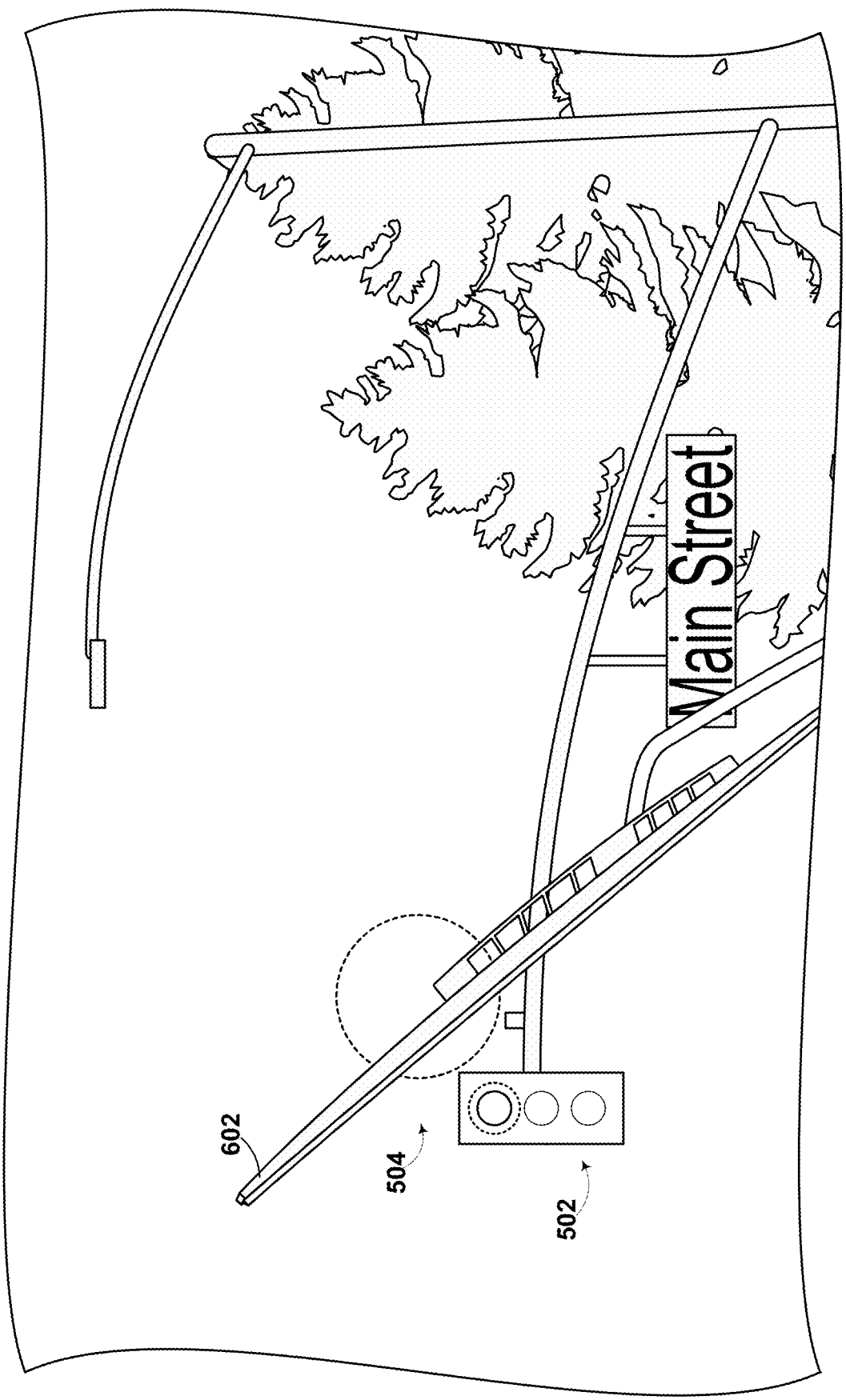
FIGS. 6A and 6B illustrate use of a wiper to control the extent of sunlight encountered by the image capture device of the autonomous vehicle, according to an example implementation.
Figure 6B:
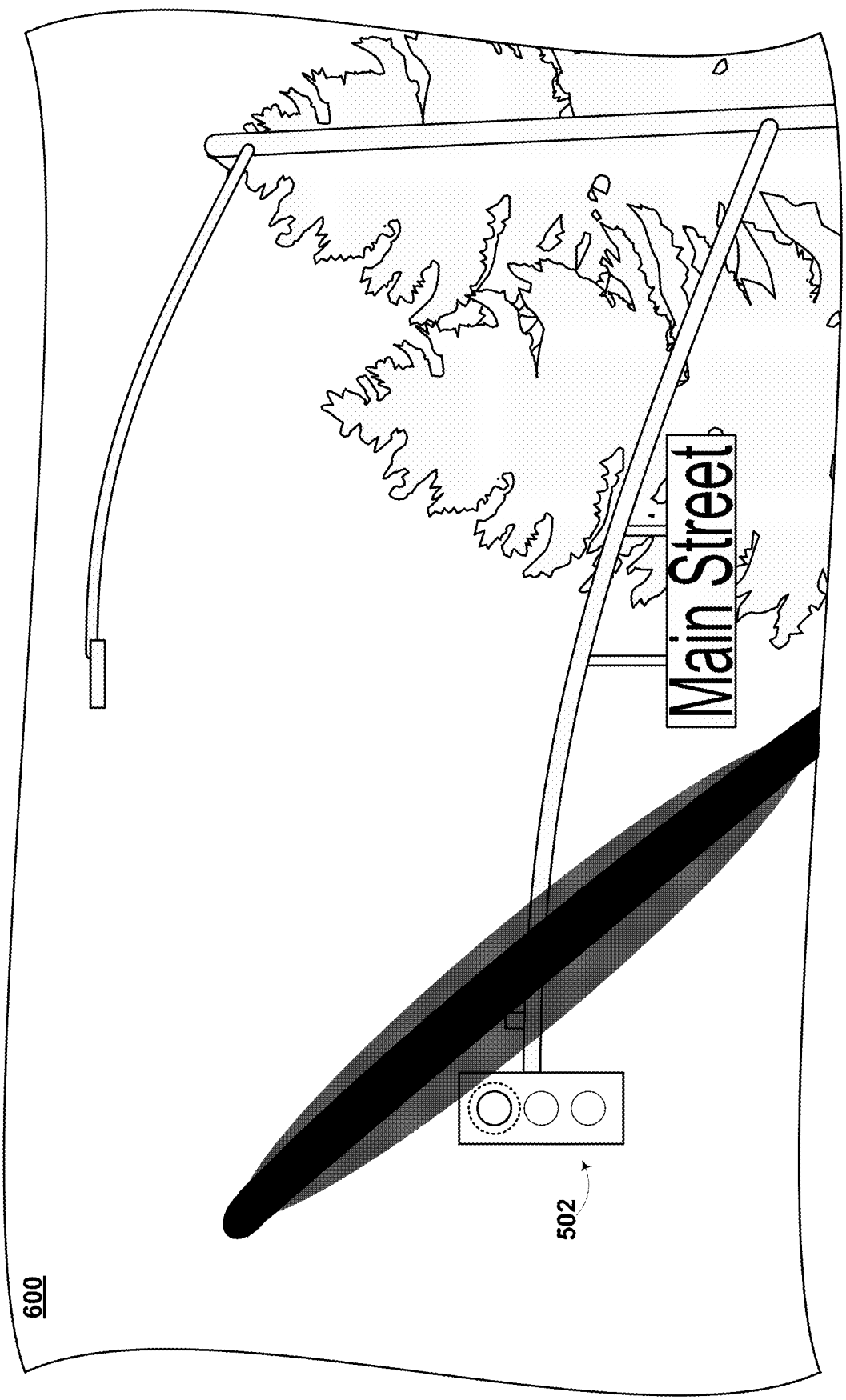
Figure 7:
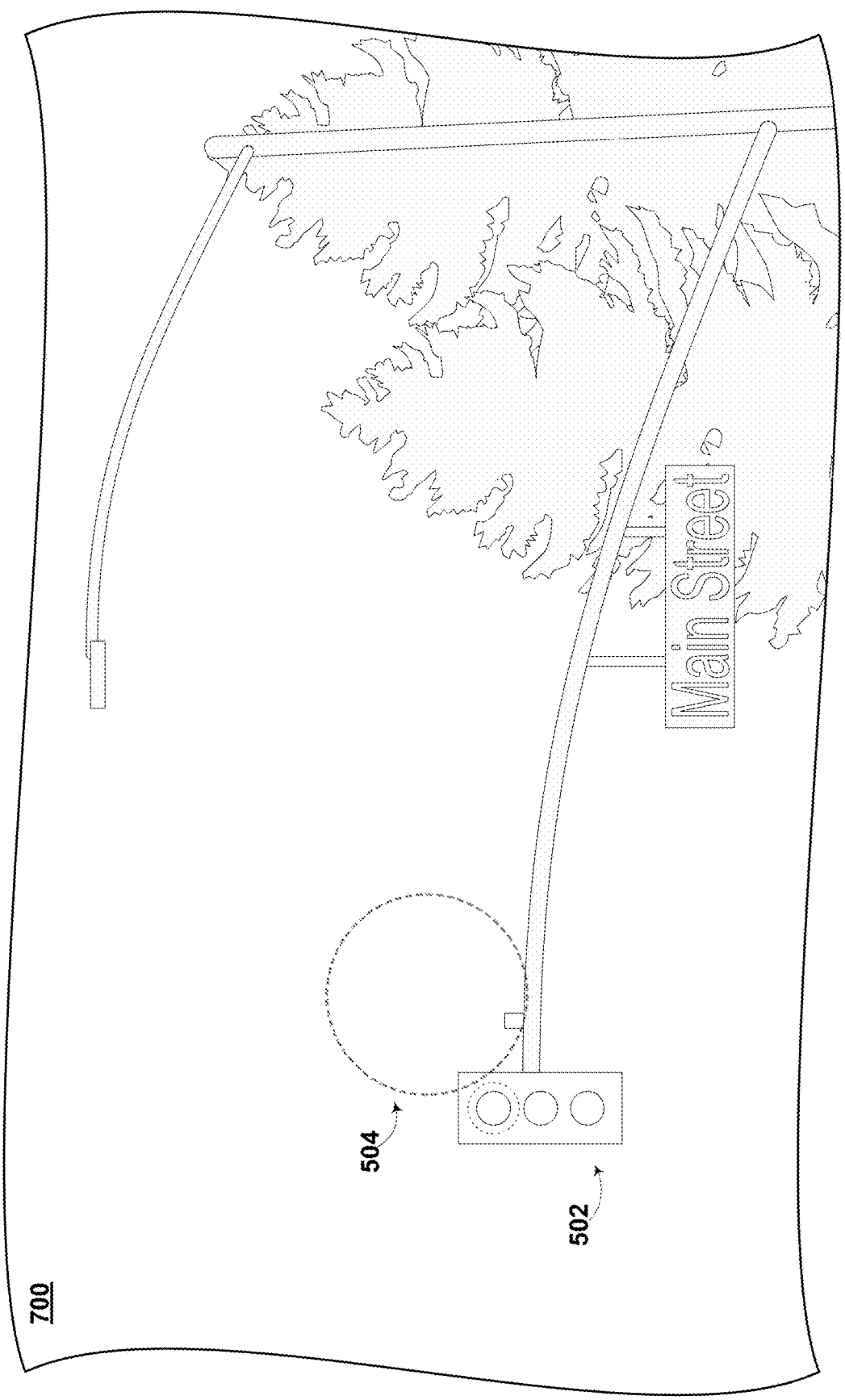
FIG. 7 illustrates use of an electrochromic device to control the extent of sunlight encountered by the image capture device of the autonomous vehicle, according to an example implementation.

FIGS. 6A-6B and 7 illustrate use of light-control feature(s) to control the extent of sunlight encountered by the image capture device of the autonomous vehicle 200, so as to help overcome the situation described above in the association with FIG. 5A-5B.

FIG. 6A illustrates use of a wiper 602 to control the extent of sunlight encountered by the image capture device of the autonomous vehicle 200. And FIG. 6B then illustrates a captured image 600 that ended up being of sufficient quality due to use of the wiper 602.

As shown, the computing system caused the wiper 602 to be positioned within the field of view of the image capture device, so that, from the perspective of the image, the wiper 602 at least partially blocks the sun 504 and does not block the traffic signal 502. As a result, despite the sun 504 being positioned in the field of view of the image capture device and being positioned substantially proximate to the traffic signal 502 from the perspective of the image capture device, movement of the wiper 602 to that position helped prevent an image artifact, thereby leading to sufficient visibility of the traffic signal 502 in the captured image 600. As such, the computing system can use the image 600 as basis for determining whether or not the top light of the traffic signal 502 is emitting light and thus whether the computing system should operate the vehicle 200 to stop at the intersection 500.

Similarly, FIG. 7 illustrates use of an electrochromic device (not shown) to control the extent of sunlight encountered by the image capture device of the autonomous vehicle 200. Specifically, FIG. 7 illustrates a captured image 700 that ended up being of sufficient quality due to use of the electrochromic device. Namely, the computing system changed the opacity of the electrochromic device to a tinted state, so as to reduce the amount of light passing through the electrochromic device and thus reduce the extent of light encountered by the image capture device. As a result, despite the sun 504 being positioned in the field of view of the image capture device and being positioned substantially proximate to the traffic signal 502 from the perspective of the image capture device, this adjustment to the electrochromic device helped prevent blooming, thereby leading to sufficient visibility of the traffic signal 502 in the captured image 600. As such, the computing system can use the image 600 as basis for determining whether or not the top light of the traffic signal 502 is emitting light and thus whether the computing system should operate the vehicle 200 to stop at the intersection 500. Other illustrations are also possible.

In a further aspect, other situations could arise that end up affecting quality of captured images, and the light-control feature could help overcome those other situations as well.

By way of example, the image capture device may be arranged to capture images of an environment through a surface, such as a windshield or glass of a housing, among others. Unfortunately, however, the surface may be exposed to aspects of the environment that can contaminate the surface (e.g., accumulation of dirt or other debris). In some cases, this situation could cause a significant decrease in the extent of external light encountered by the image capture device, which could significantly reduce quality of captured images. Whereas, in other cases, this situation could cause a significant increase in the extent of external light encountered by the image capture device, which could also significantly reduce quality of captured images. In any case, the computing system could evaluate captured images to detect signs of such contamination (e.g., identify accumulation of dirt on the surface). And if the computing system detects signs of contamination, the computing system could responsively operate the wiper to move in an attempt to remove the contamination, thereby providing another way to control the extent of light encountered by the image capture device.

In another example, the image capture device may be arranged to capture images of an environment through a surface, such as a windshield or glass of a housing, among others. Unfortunately, however, the surface may be end up being damaged (e.g., glass may scratch or crack). In practice, the damage could cause a significant decrease in the extent of external light encountered by the image capture device, such as by reducing the amount of light passing through the surface, which could significantly reduce quality of captured images. But in other cases, the damage could cause a significant increase in the extent of external light encountered by the image capture device, such as by increasing the amount of stray light reaching the image sensor, which could also significantly reduce quality of captured images. In any case, the computing system could evaluate captured images to detect signs of such damage (e.g., detect stray light arriving from outside of the field of view of the image capture device). And if the computing system detects signs of damage, the computing system could responsively operate the wiper in an attempt to mitigate the damage. For instance, the computing system could responsively move the wiper to a position that blocks light from passing through the damaged portion of the surface at issue, such as to a position that is outside of the field of view of the image capture device, thereby providing another way to control the extent of light encountered by the image capture device. Other examples are also possible.

V. Illustrative Methods

Figure 8:
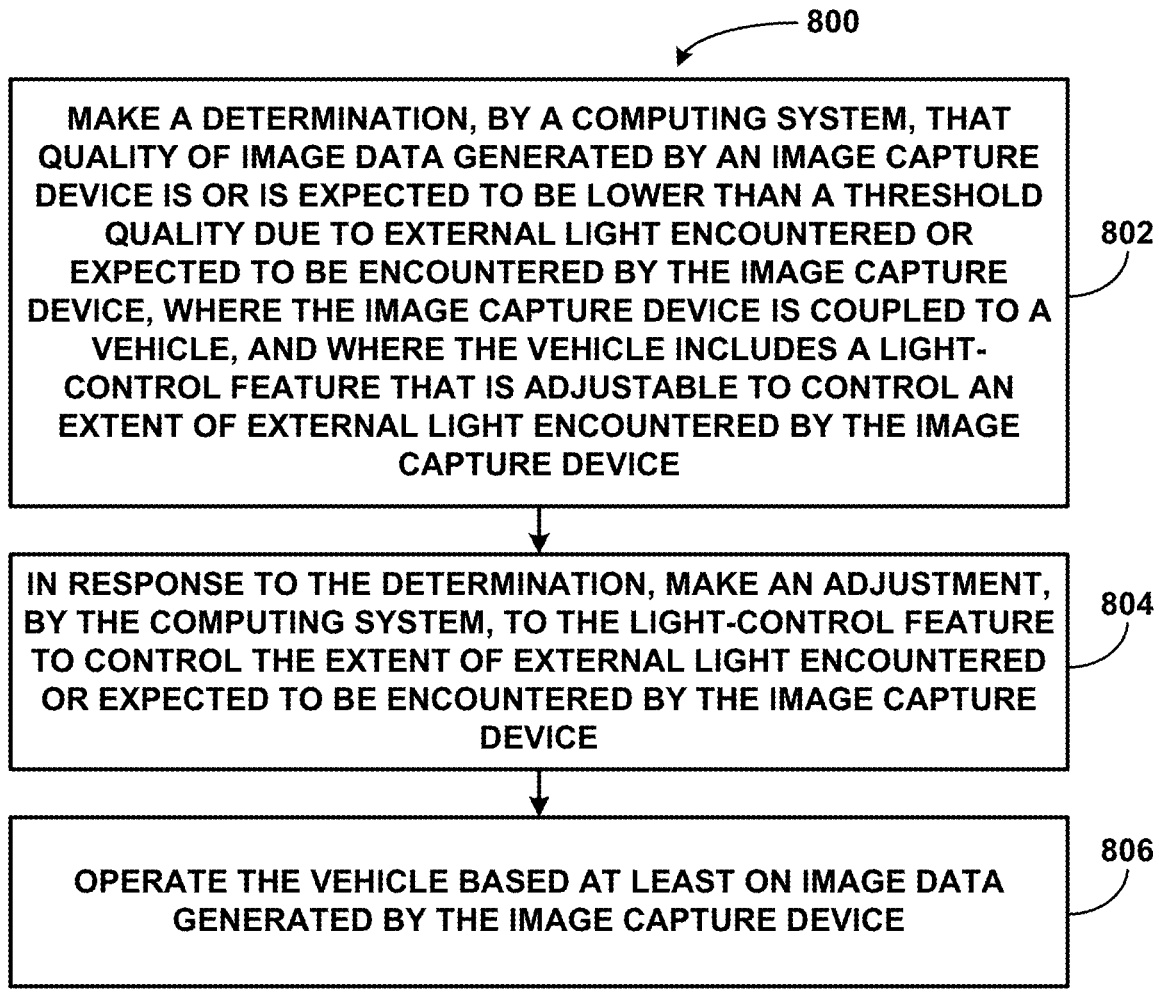
FIG. 8 is a flowchart of a method, according to an example implementation.

FIG. 8 is a flowchart illustrating a method 800, according to an example implementation. Method 800 shown in FIG. 8 (and other processes and methods disclosed herein) presents a method that can be implemented within an arrangement involving, for example, any of the systems shown in FIGS. 1-7 (or more particularly by one or more components or subsystems thereof, such as by a processor and a non-transitory computer-readable medium having instructions that are executable to cause the device to perform functions described herein), among other possible systems.

Method 800 and other processes and methods disclosed herein may include one or more operations, functions, or actions, as illustrated by one or more of blocks 802-806 for instance. Although blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of the present disclosure. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

At block 802, method 800 may involve a computing system making a determination that quality of image data generated by an image capture device is or is expected to be lower than a threshold quality due to external light encountered or expected to be encountered by the image capture device. Generally, the image capture device may be coupled to a vehicle, and the vehicle may include a light-control feature that is adjustable to control an extent of external light encountered by the image capture device. Additionally, at block 804, method 800 may involve, in response to the determination, the computing system making an adjustment to the light-control feature to control the extent of external light encountered or expected to be encountered by the image capture device. Further, at block 806, method 800 may involve operating the vehicle based at least on image data generated by the image capture device.

Figure 9:
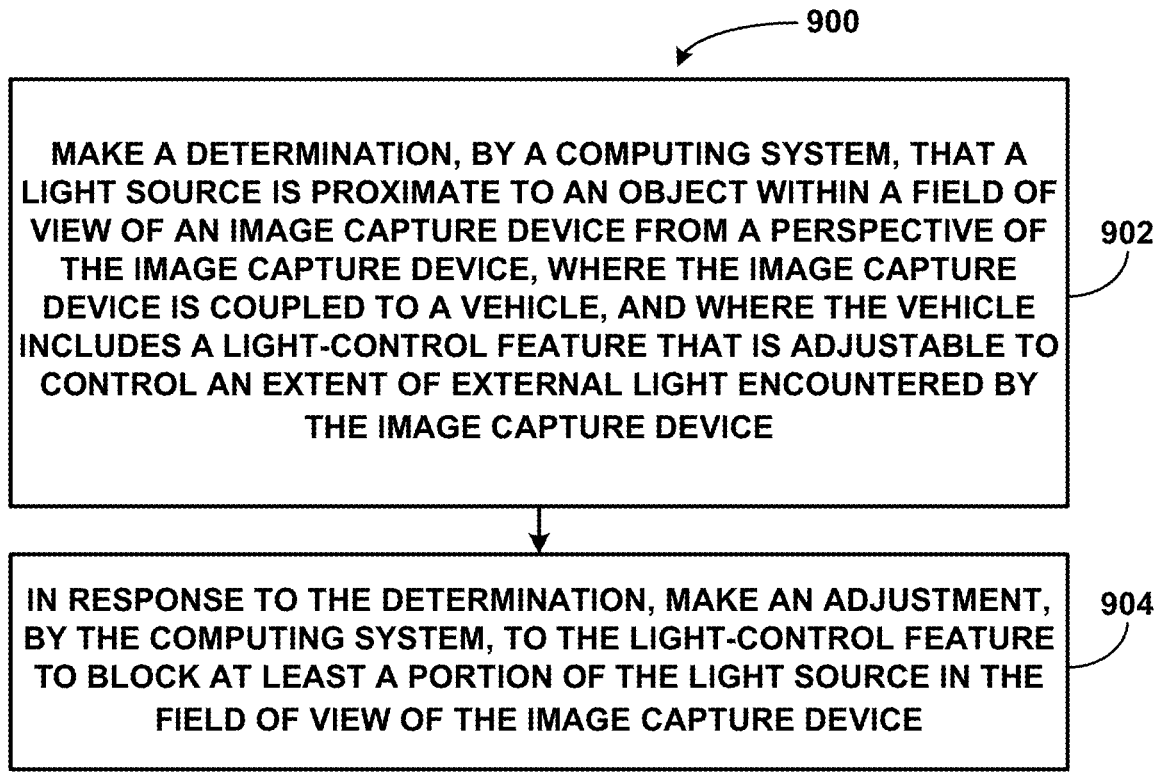
FIG. 9 is a flowchart of another method, according to an example implementation.

FIG. 9 is a flowchart illustrating another method 900, according to an example implementation. At block 902, method 900 may involve a computing system making a determination, that a light source is proximate to an object within a field of view of an image capture device from a perspective of the image capture device. Here again, the image capture device may be coupled to a vehicle, and the vehicle may include a light-control feature that is adjustable to control an extent of external light encountered by the image capture device. Additionally, at block 904, method 900 may involve, in response to the determination, the computing system making an adjustment to the light-control feature to block at least a portion of the light source in the field of view of the image capture device.

Figure 10:
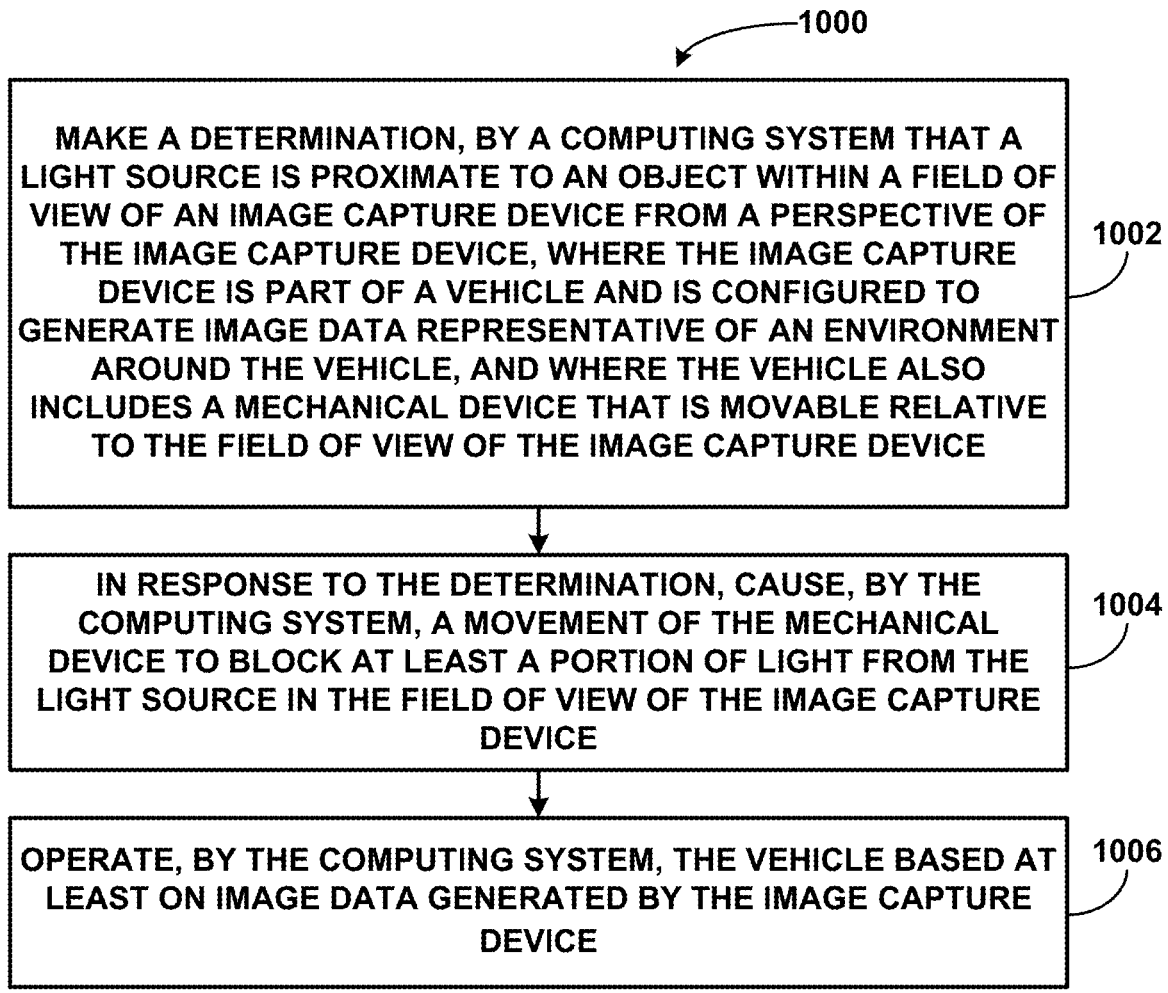
FIG. 10 is a flowchart of yet another method, according to an example implementation.

FIG. 10 is a flowchart illustrating yet another method 1000, according to an example implementation. At block 1002, method 1000 may involve a computing system making a determination that a light source is proximate to an object within a field of view of an image capture device from a perspective of the image capture device. Generally, the image capture device may be part of a vehicle, and the vehicle may also include a mechanical device that is movable relative to a field of view of the image capture device. Additionally, at block 1004, method 1000 may involve, in response to the determination, the computing system causing a movement of the mechanical device to block at least a portion of light from the light source in the field of view of the image capture device. Further, at block 1006, method 1000 may involve the computing system operating the vehicle based on image data generated by the image capture device.

VI. Example Computer Program Product

Figure 11:
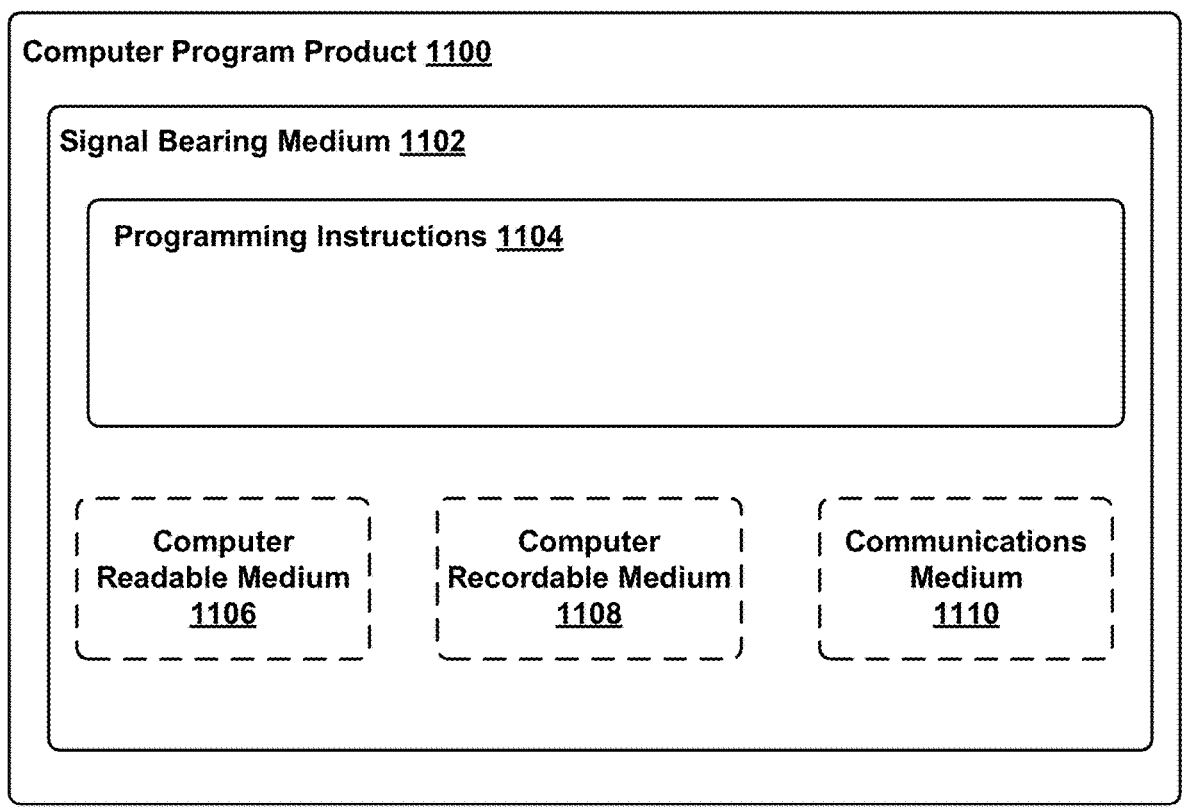
FIG. 11 is a schematic diagram of a computer program product, according to an example implementation.

FIG. 11 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 1100 is provided using signal bearing medium 1102, which may include one or more programming instructions 1104 that, when executed by one or more processors may provide functionality or portions of the functionality described above with respect to FIGS. 1-10. In some examples, the signal bearing medium 1102 may encompass a non-transitory computer-readable medium 1106, such as, but not limited to, a hard disk drive, a CD, a DVD, a digital tape, memory, components to store remotely (e.g., on the cloud) etc. In some implementations, the signal bearing medium 1102 may encompass a computer recordable medium 1108, such as, but not limited to, memory, read/write (R/W) CDs, R/W DVDs, etc. In some implementations, the signal bearing medium 1102 may encompass a communications medium 1110, such as, but not limited to, a digital and/or an analog communication medium (e.g., a fiber optic cable, a waveguide, a wired communications link, a wireless communication link, etc.). Similarly, the signal bearing medium 1102 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 1102 may be conveyed by a wireless form of the communications medium 1110.

The one or more programming instructions 1104 may be, for example, computer executable and/or logic implemented instructions. In some examples, a computing device such as the computer system 112 of FIG. 1 or remote computing system 302 and perhaps server computing system 306 of FIG. 3 or one of the processor of FIG. 4A may be configured to provide various operations, functions, or actions in response to the programming instructions 1104 conveyed to the computer system 112 by one or more of the computer readable medium 1106, the computer recordable medium 1108, and/or the communications medium 1110.

The non-transitory computer readable medium could also be distributed among multiple data storage elements and/or cloud (e.g., remotely), which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

VII. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A method comprising:
   making a determination, by a computing system, that quality of image data generated by an image capture device is or is expected to be lower than a threshold quality due to external light encountered or expected to be encountered by the image capture device, wherein the image capture device is coupled to a vehicle, wherein the vehicle includes a light-control feature that is adjustable to control an extent of external light encountered by the image capture device, wherein the light-control feature comprises a wiper, and wherein the wiper is separate from the image capture device;
   in response to the determination, making an adjustment, by the computing system, to the light-control feature to control the extent of external light encountered or expected to be encountered by the image capture device, wherein making the adjustment comprises adjusting a position of the wiper to reduce the extent of external light encountered or expected to be encountered by the image capture device; and
   operating the vehicle based at least on image data generated by the image capture device.

2. The method of claim 1, wherein making the determination comprises determining that a light source is or is expected to be proximate to an object within a field of view of the image capture device from a perspective of the image capture device.

3. The method of claim 1, wherein making the determination comprises determining that the image capture device is encountering or is expected to encounter one or more of the following: (i) blooming, (ii) oversaturation, (iii) threshold high exposure to external light, (iv) threshold low exposure to external light, (v) generation of image data having threshold low resolution, and (vi) generation of image data unusable for detection or identification of an object.

4. The method of claim 1, wherein adjusting position of the wiper comprises adjusting position of the wiper relative to the image capture device and relative to a light source generating external light.

5. The method of claim 1, wherein the image capture device is disposed within a housing that is coupled to the vehicle, and wherein the wiper is coupled to the housing.

6. The method of claim 1, wherein the light-control feature further comprises a light-control device having adjustable light transmission properties, and wherein making the adjustment further comprises adjusting light transmission properties of the light-control device to control the extent of external light encountered or expected to be encountered by the image capture device.

7. The method of claim 6, wherein the light-control device is an electrochromic device.

8. The method of claim 1, wherein the adjustment is based on causing quality of image data generated by the image capture device to be higher than the threshold quality.

9. A method comprising:
   making a determination, by a computing system, that a light source is proximate to an object within a field of view of an image capture device from a perspective of the image capture device, wherein the image capture device is coupled to a vehicle, wherein the vehicle includes a light-control feature that is adjustable to control an extent of external light encountered by the image capture device, wherein the light-control feature comprises a wiper, and wherein the wiper is separate from the image capture device; and
   in response to the determination, making an adjustment, by the computing system, to the wiper to block at least a portion of the light source in the field of view of the image capture device.

10. The method of claim 9, wherein the light source is the sun.

11. The method of claim 9, wherein the object is a traffic signal.

12. The method of claim 9, further comprising:
   operating, by the computing system, the image capture device to generate image data during the adjustment to the wiper, wherein the image data comprises a plurality of images; and
   operating, by the computing system, the vehicle based at least on image data generated by the image capture device,
   wherein operating the vehicle based at least on image data generated by the image capture device comprises operating the vehicle based at least on a particular image, from among the plurality of images, in which the wiper blocks at least a portion of the light source in the field of view of the image capture device.

13. The method of claim 12, wherein the adjustment to the wiper moves the wiper incrementally across a field of view of the image capture device.

14. A vehicle comprising:
   an image capture device configured to generate image data representative of an environment around the vehicle;
   a wiper that is movable relative to a field of view of the image capture device, wherein the wiper is separate from the image capture device; and
   a computing system configured to:
      make a determination that a light source is proximate to an object within the field of view of the image capture device from a perspective of the image capture device;
      in response to the determination, cause a movement of the wiper to block at least a portion of light from the light source in the field of view of the image capture device; and
      operate the vehicle based on image data generated by the image capture device.

15. The vehicle of claim 14, wherein causing a movement of the wiper to block at least a portion of the light source in the field of view of the image capture device comprises causing incremental movements of the wiper that alter the extent of external light encountered by the image capture device.

16. The vehicle of claim 14,
   wherein the computing system is further configured to operate the image capture device to generate image data during the movement of the wiper, wherein the image data comprises a plurality of images, and
   wherein operating the vehicle based on image data generated by the image capture device comprises operating the vehicle based at least on a particular image, from among the plurality of images, in which the wiper blocks at least a portion of the light source in the field of view of the image capture device.

17. The vehicle of claim 16, wherein the object is visible in the particular image.

18. The method of claim 1, wherein adjusting the position of the wiper blocks at least a portion of light from a light source that is or is expected to be proximate to an object within a field of view of the image capture device from a perspective of the image capture device.

19. The method of claim 18, wherein the light source is the sun, and wherein the object is a traffic signal.

\* \* \* \* \*